United States Patent
Nakanishi et al.

(10) Patent No.: US 9,725,251 B2
(45) Date of Patent: Aug. 8, 2017

(54) SHEET PROCESSING SYSTEM AND SHEET PROCESSING METHOD

(71) Applicant: Kabushiki Kaisha Toshiba, Tokyo (JP)

(72) Inventors: Ayaka Nakanishi, Kanagawa (JP); Hisashi Oosawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/061,492

(22) Filed: Mar. 4, 2016

(65) Prior Publication Data

US 2017/0066600 A1 Mar. 9, 2017

(30) Foreign Application Priority Data

Sep. 9, 2015 (JP) .................................. 2015-177510

(51) Int. Cl.
- *B65G 49/00* (2006.01)
- *B65G 47/49* (2006.01)
- *G07D 11/00* (2006.01)

(52) U.S. Cl.
CPC ............ *B65G 47/49* (2013.01); *B65G 49/00* (2013.01); *G07D 11/0006* (2013.01); *G07D 11/0009* (2013.01); *G07D 11/0045* (2013.01); *B65G 2201/0285* (2013.01); *B65G 2203/0216* (2013.01)

(58) Field of Classification Search
CPC ........... G07D 11/0006; G07D 11/0009; G07D 11/0045; B65G 49/00
USPC .. 198/340, 341.01, 341.03, 348, 349.6, 617; 700/230; 271/9.01, 9.05; 399/407
See application file for complete search history.

(56) References Cited

U.S. PATENT DOCUMENTS

| | | | |
|---|---|---|---|
| 5,917,727 A * | 6/1999 | Richardson | B41J 13/0027 271/227 |
| 6,516,239 B1 * | 2/2003 | Madden | G05B 19/41815 198/349 |
| 6,860,375 B2 | 3/2005 | Hallowell et al. | |
| 6,929,109 B1 | 8/2005 | Klein et al. | |
| 7,389,084 B2 * | 6/2008 | Watanabe | G03G 15/6558 271/3.01 |
| 7,468,670 B2 * | 12/2008 | Liu | B07C 5/3412 235/384 |

(Continued)

FOREIGN PATENT DOCUMENTS

EP 1220168 A2 7/2002
WO WO2011078177 A1 6/2011

*Primary Examiner* — Douglas Hess
(74) *Attorney, Agent, or Firm* — Baker Botts L.L.P.

(57) ABSTRACT

A sheet processing system comprising:
a plurality of sheet processing apparatuses;
a conveying unit conveying a container containing a plurality of sheets;
a distribution unit for distributing the container to any one of the plurality of sheet processing apparatuses;
an identification information reading unit for obtaining identification information from the container;
a communication unit for receiving information about the paper sheets contained in the container; and
a controller for controlling a distribution destination of the container, on the basis of information about processing situations of the plurality of sheet processing apparatuses, the identification information about the container, and the information about the sheets contained in the container.

20 Claims, 13 Drawing Sheets

(56) References Cited

U.S. PATENT DOCUMENTS

| | | | | |
|---|---|---|---|---|
| 7,770,880 B2 * | 8/2010 | Yamazaki | ................ | B65H 3/44 |
| | | | | 271/9.01 |
| 7,805,217 B2 * | 9/2010 | Chudy | ................ | G06F 19/3462 |
| | | | | 700/230 |
| 7,809,464 B2 * | 10/2010 | Owen | .................... | B41F 21/00 |
| | | | | 101/183 |
| 8,040,535 B2 * | 10/2011 | Kurahashi | .......... | H04N 1/00567 |
| | | | | 271/176 |
| 8,108,067 B2 * | 1/2012 | Uejo | .................. | B02C 18/0007 |
| | | | | 270/52.02 |
| 8,185,039 B2 * | 5/2012 | Kato | ........................ | B42B 4/00 |
| | | | | 399/407 |
| 8,430,303 B1 | 4/2013 | Sanders et al. | | |
| 9,014,844 B2 * | 4/2015 | Casey | .................. | B65G 57/302 |
| | | | | 700/217 |
| 9,020,634 B2 * | 4/2015 | Bailey | ...................... | B07C 3/00 |
| | | | | 209/584 |
| 9,384,457 B2 * | 7/2016 | Furukawa | .............. | G06Q 10/08 |
| 2002/0107800 A1 | 8/2002 | Kadowaki et al. | | |
| 2012/0279173 A1 | 11/2012 | Sakoguchi et al. | | |
| 2014/0339301 A1 | 11/2014 | Angus et al. | | |

* cited by examiner

|  | LOADING STORAGE #1 | LOADING STORAGE #2 | LOADING STORAGE #3 | LOADING STORAGE #4 | ATM CASSETTE |
|---|---|---|---|---|---|
| FIX TYPE OF SHEETS / AUTO ASSIGN | FIX | FIX | AUTO ASSIGN | AUTO ASSIGN | AUTO ASSIGN |
| TYPE OF SHEETS | C3 | C1 | C4 | C2 | C5 |
| NUMBER OF SHEETS THAT CAN BE CONTAINED | N1 | N2 | N3 | N4 | N5 |
| PRESENT NUMBER OF CONTAINED SHEETS | K1 | K2 | K3 | K4 | K5 |

FIG. 11

SHEET PROCESSING SYSTEM AND SHEET PROCESSING METHOD

CROSS-REFERENCE TO RELATED APPLICATIONS

This application is based upon and claims the benefit of priority from the prior Japanese Patent Applications No. 2015-177510 filed on Sep. 9, 2015, the entire contents of which are incorporated herein by reference.

FIELD

An embodiment of the present invention relates to a sheet processing system and a sheet processing method.

BACKGROUND

In the past, paper sheets contained in an Automated Teller Machine (ATM) and the like are contained in a housing of an ATM cassette and the like taken out from the Automated Teller Machine and the like. In the past, a person such as an operator has to manually count the paper sheets contained in the housing of the ATM cassette and the like.

Therefore, it used to be required to efficiently process the paper sheets contained in many housings (cases) collected from the Automated Teller Machine and the like.

BRIEF DESCRIPTION OF THE DRAWING

FIG. 11 is a figure illustrating an example of processing situation information of a paper sheet processing apparatus 300 according to the embodiment.

DETAILED DESCRIPTION

A paper sheet processing system according to an embodiment will be explained hereinafter with reference to drawings.

In the following embodiment, a paper sheet P to be processed is considered to be, for example, a banknote, but the paper sheet processing system may process paper sheets other than a banknote such as mails or various kinds of cards or tickets.

First, an ATM (Automated Teller Machine) cassette 10 to be processed by the paper sheet processing system 1 according to the embodiment will be explained.

Figure 1:
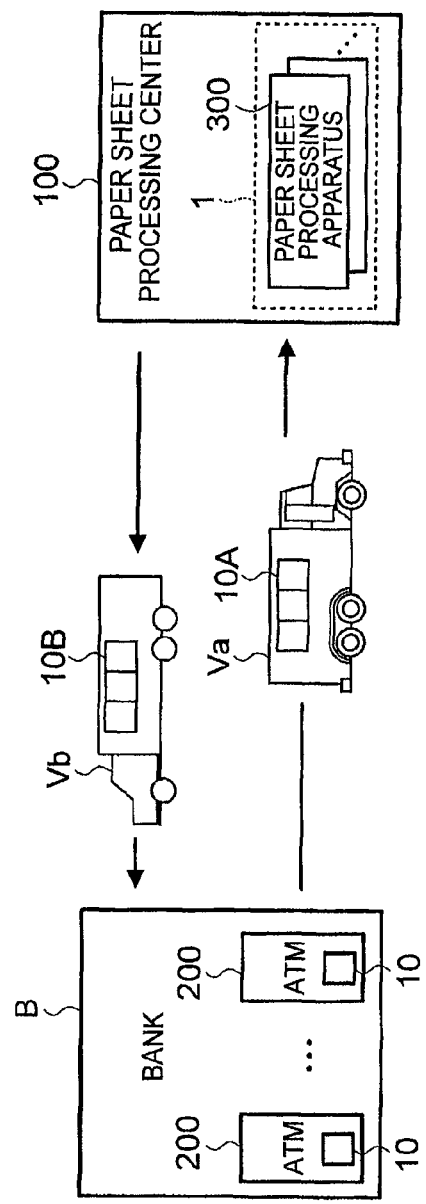
FIG. 1 is a figure illustrating how an ATM cassette 10 according to an embodiment is collected and distributed.

FIG. 1 is a figure illustrating how the ATM cassettes 10 according to the embodiment is collected and distributed. An Automated Teller Machine (ATM) 200 to which the ATM cassettes 10 can be detachably attached is installed in a bank B. In a case where the Automated Teller Machine 200 discharges the paper sheets P, the Automated Teller Machine 200 takes out the paper sheets P contained in the ATM cassette 10, and in a case where the Automated Teller Machine 200 receives the paper sheets P, the Automated Teller Machine 200 loads the received paper sheets P into the ATM cassette 10. The ATM cassette 10 is detached from the Automated Teller Machine 200 and collected by the collection company. The ATM cassette 10A that has been collected (hereinafter referred to as a collection cassette 10A) is carried by a delivery vehicle Va to a paper sheet processing center 100. A paper sheet processing apparatus 300 installed in the paper sheet processing center 100 performs various kinds of processing on the paper sheets P contained in the collection cassette 10A. The paper sheet processing apparatus 300 loads the paper sheets P having been subjected to various kinds of processing into the ATM cassette 10 again. An ATM cassette 10B including the paper sheets P having been subjected to various kinds of processing (hereinafter referred to as a delivery cassette 10B) is carried by a delivery vehicle Vb of a delivery company to the bank B and is attached to the Automated Teller Machine 200. In this explanation, the ATM cassette 10 is detachably attached to the Automated Teller Machine 200 in the bank B, but the embodiment is not limited thereto. For example, the ATM cassette 10 may be configured to be detachably attached to a cash processing machine installed in a department store or a supermarket.

Figure 2:
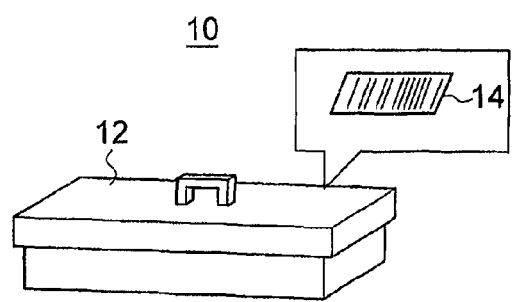
FIG. 2 is a configuration diagram illustrating an example of the paper sheet cassette 10 according to the embodiment.

FIG. 2 is a configuration diagram illustrating an example of the paper sheet cassette 10 according to the embodiment. The ATM cassette 10 includes a housing 12 (container) and a bar code 14 attached to the housing 12. Multiple paper sheets P are contained in the housing 12. The housing 12 is provided with a take out mechanism (not shown) of paper sheets P for taking out or capable of receiving the paper sheets P by the Automated Teller Machine 200. A bar code 14 from which information for identifying the ATM cassette 10 (hereinafter referred to as a cassette ID (identification)) can be decoded is attached to the upper surface of the housing 12. For example, the cassette ID is identification information attached to the ATM cassette 10 such as a serial number, a coded ID, or the like. In the present embodiment, the bar code 14 that makes the cassette ID readable will be explained, but the bar code 14 is not limited thereto. Alternatively, an RFID (Radio Frequency identifier) chip, a character string drawn on the housing 12, a two-dimensional code such as a QR code (registered trademark), and the like may also be employed. The ATM cassette 10 includes a type which can load the paper sheets P (deposit) only, a type capable of taking out the paper sheets P (withdrawal) only, or capable of loading and taking out the paper sheets P (deposit and withdrawal), but the ATM cassette 10 of the present embodiment may be of any type.

Figure 3:
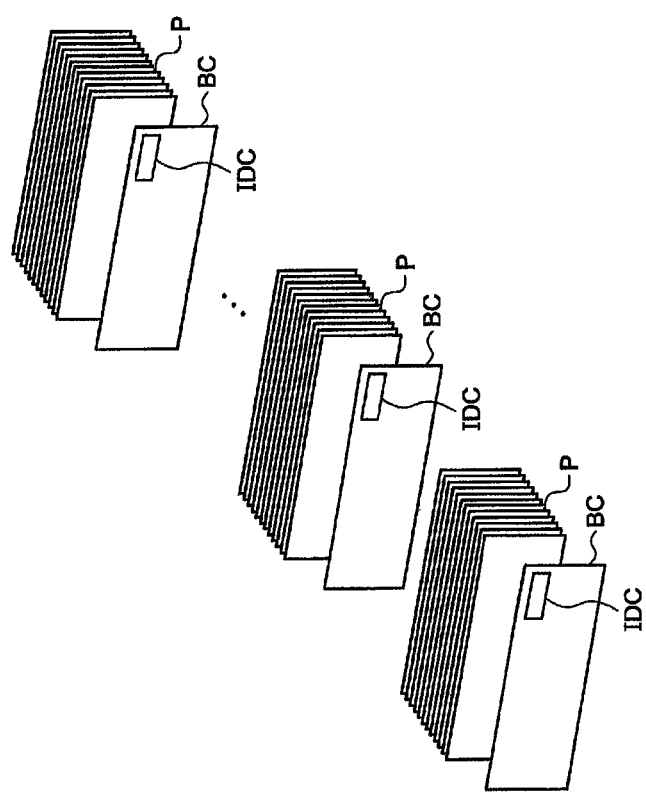
FIG. 3 is a configuration diagram illustrating a paper sheet P contained in the paper sheet cassette 10 according to the embodiment.

FIG. 3 is a configuration diagram illustrating paper sheets P contained in the paper sheet cassette 10 according to the embodiment. Multiple paper sheets P are accumulated in the thickness direction of the paper sheet P, and are contained in the ATM cassette 10. A batch card BC may be sandwiched in multiple paper sheets P. The batch card BC is, for example, formed to have the same external diameter dimension as the paper sheet P, and made by embedding a wireless chip IDC using an RFID technique into a paper base material. The wireless chip IDC includes a communication unit, a control unit, and a storage unit. The storage unit stores, for example, information about the type (kind) of the paper sheet P and the number of paper sheets P. The wireless chip IDC reads information stored in the storage unit and wirelessly outputs the information on the basis of a command from the reader writer, or reads the information transmitted by the reader writer and stores the information to the storage unit. In the following explanation, it is assumed that the collection cassette 10A does not contain the batch card BC, and the delivery cassette 10B contains the batch card BC as a result of processing of the paper sheet processing apparatus 300.

Figure 4:
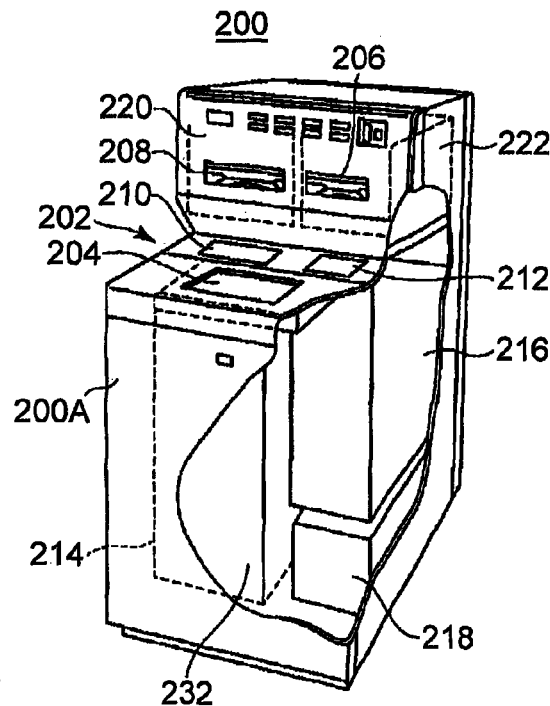
FIG. 4 is a perspective view illustrating a front view an Automated Teller Machine 200 according to the embodiment.
Figure 5:
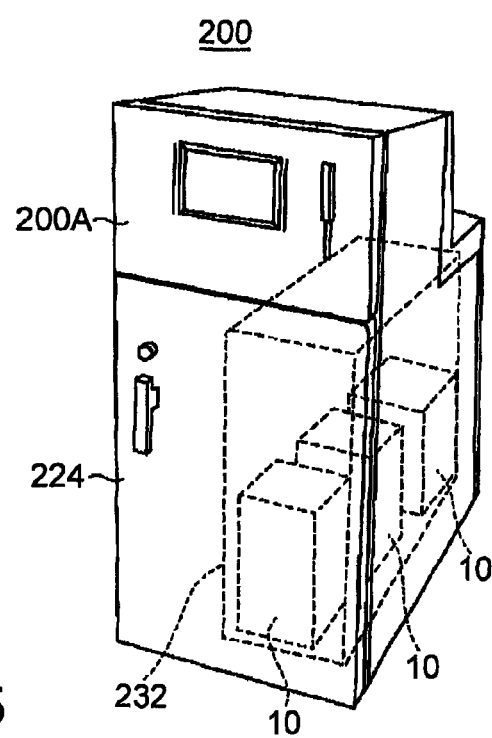
FIG. 5 is a perspective view illustrating a back surface of the Automated Teller Machine 200 according to the embodiment.

The Automated Teller Machine 200 to which the ATM cassette 10 is detachably attached will be explained hereinafter. FIG. 4 is a perspective view illustrating a front side of the Automated Teller Machine 200 according to the embodiment. FIG. 5 is a perspective view illustrating a back surface of the Automated Teller Machine 200 according to the embodiment.

The Automated Teller Machine 200 includes a substantially rectangular box-shaped main body 200A, and the front surface of the main body is provided with a substantially L shaped service panel 202 that faces the user. A display unit 204 also serving as a touch panel is provided in a horizontal portion of the service panel 202. A card insertion port 206, a bankbook insertion port 208, and the like are provided in a vertical portion. A banknote deposit and withdrawal port 210 and a coin deposit and withdrawal port 212 each opened and closed by a door are provided at a corner portion of the service panel 202. A banknote handling apparatus 214 for allowing the user to deposit and withdrawn the paper sheets P via the banknote deposit and withdrawal port 210, a coin handling apparatus 216 for allowing the user to deposit and withdraw the coins via the coin deposit and withdrawal port 212, a control unit 218, a bankbook printer 220, a card/slip processing apparatus 222, and the like are provided in the main body 200A.

A door 224 that can be opened and closed to allow the ATM cassette 10, the banknote handling apparatus 214, and the coin handling apparatus 216 to be removed from the main body is provided on the back surface of the main body 200A. The banknote handling apparatus 214 has a long and narrow box shaped housing 232, and the ATM cassettes 10 serving as loading storages are arranged in a line in this housing 232. For example, ATM cassettes 10 containing 10,000 yen banknotes, 1,000 yen banknotes, and the like are arranged in a line in the Automated Teller Machine 200. These ATM cassettes 10 can be detached from the housing 232 or attached to the inside of the housing 232 by opening the door 224 and pulling out the housing 232. In addition, provided inside of the housing 232 are an accumulation unit which receives the paper sheets P given from the banknote deposit and withdrawal port 210 and through which the withdrawal banknotes are withdrawn, a deposit temporary accumulation unit temporarily accumulating the deposit banknotes, a determination processing unit for determining deposit banknotes and withdrawal banknotes, a pair of rejection storages containing rejection banknotes, and a collection storage containing damaged bills and the like. The ATM cassette 10 removed from the Automated Teller Machine 200 is detachably attached to an attachment unit 310b of the paper sheet processing apparatus 300 explained later.

Figure 6:
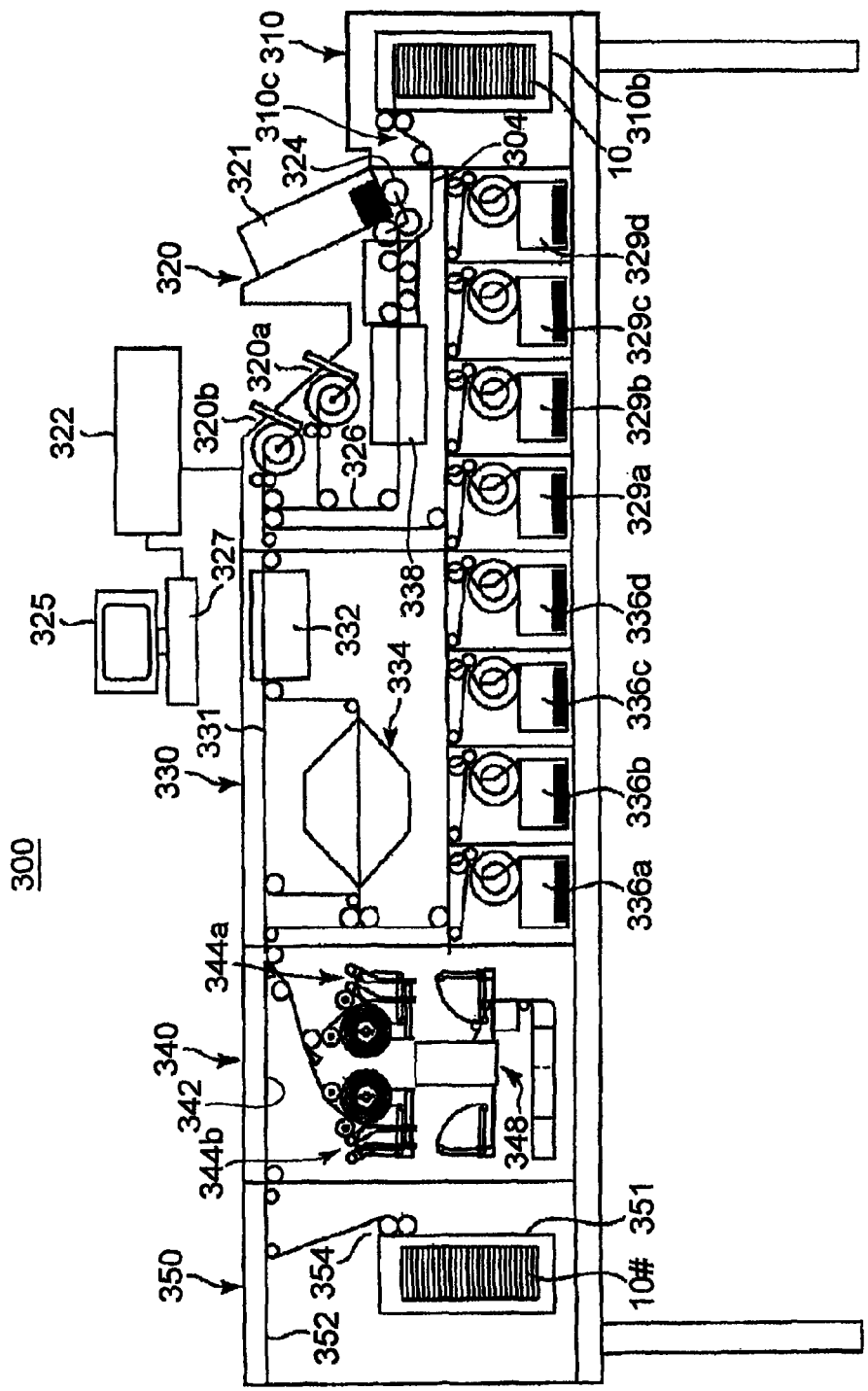
FIG. 6 is a configuration diagram illustrating the paper sheet processing apparatus 300 according to the embodiment.
Figure 7:
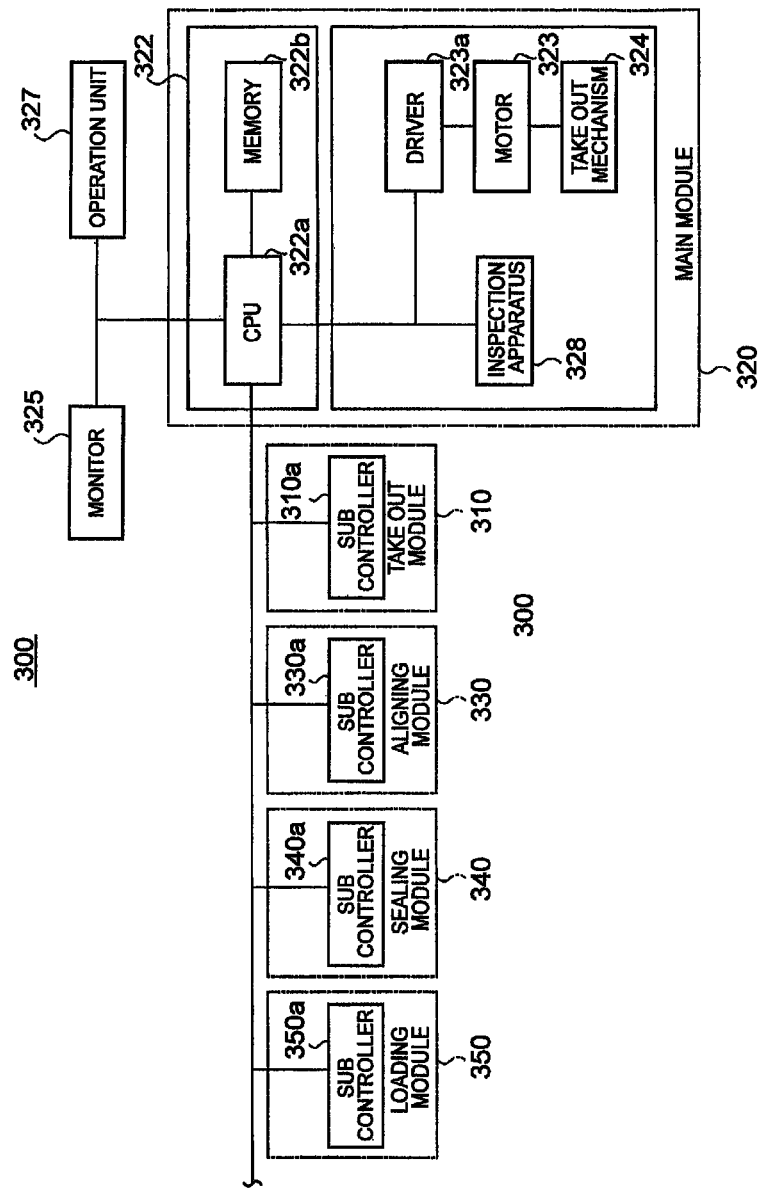
FIG. 7 is a functional configuration diagram illustrating a paper sheet processing apparatus 300 according to an embodiment.

The paper sheet processing apparatus 300 according to the embodiment will be explained hereinafter. FIG. 6 is a configuration diagram illustrating the paper sheet processing apparatus 300 according to the embodiment. FIG. 7 is a functional configuration diagram illustrating the paper sheet processing apparatus 300 according to the embodiment.

The paper sheet processing apparatus 300 includes a take out module 310, a main module 320, an aligning module 330, a sealing module 340, and a loading module 350. The take out module 310, the main module 320, the aligning module 330, the sealing module 340, and the loading module 350 are arranged in a line in this order, and are coupled with each other electrically and mechanically. A main controller 322 controlling operation of the main module 320 and the entire apparatus is provided in the main module 320.

The take out module 310 is provided at the upstream side of the main module 320. The take out module 310 includes an attachment unit 310b and a take out mechanism 310c. The ATM cassette 10 is detachably attached to the attachment unit 310b. The take out mechanism 310c takes out the paper sheets P contained in the ATM cassette 10 and conveys the paper sheets P to the conveying path connected to the take out mechanism 324 of the main module 320. The conveying path of the take out module 310 is in communication with the conveying path 304 provided at the take out mechanism 324 of the main module 320. In a case where the ATM cassette 10 is attached to the attachment unit 310b, the take out module 310 may have a bar code reader for reading the bar code 14 of the ATM cassette 10. The take out module 310 uses the bar code reader to decode the bar code 14 and outputs the cassette ID to the main controller 322.

The main controller 322 is achieved with an information processing apparatus implemented on a control board in the main module 320. The main controller 322 includes a CPU (Central Processing Unit) 322a controlling operation of each module, a memory 322b storing various kinds of data, control programs, management information, and the like. The cassette ID of the ATM cassette 10, the operator ID, information about the date, the time and the like, multiple levels of processing speeds of the paper sheets P, and the like are stored in the memory 322b as various kinds of data.

The main controller 322 is connected to an operation unit 327 for inputting various kinds of information to the apparatus, and a monitor 325 serving as a display apparatus for displaying input information, the operation state and the processing state of the apparatus, and the like. The take out module 310, the aligning module 330, the sealing module 340, and the loading module 350 include sub controllers 310a, 330a, 340a, and 350a, respectively, for controlling the operation of the modules. The sub controllers 310a, 330a, 340a, and 350a are connected via a LAN (Local Area Network) to the main controller 322 of the main module 320.

The operation unit 327 receives operation by the administrator of the paper sheet processing apparatus 300. The main controller 322 performs various kinds of operation setting of the processing apparatus on the basis of operation received with the operation unit 327, for example, such as a setting of a transaction method such as a deposit operation, organizing operation, and the like, inspection processing of the paper sheets P in the ATM cassette 10, loading processing to the ATM cassette 10, setting of sealing processing, and normal/damaged level setting which is a determination level of the paper sheets P.

The main controller 322 calculates management information in accordance with processing information which is output from the inspection apparatus 328, including the processing efficiency in unit time, the processing efficiency of each of multiple days, the processing efficiency of each operator ID, the total processing number, or the total operation time. The main controller 322 stores the calculated information to the memory 322b, and displays the information on the monitor 325.

The main module 320 includes a supply unit 321 in which many banknotes P are placed in a stacked state, a take out mechanism 324 for taking out each of the paper sheets P one by one from the supply unit 311, and a conveying path 326 for conveying the paper sheets P taken out by the retrieval mechanism 324. In the conveying path 326, multiple endless conveying belts, not shown, are extended to sandwich the conveying path. The taken out paper sheets P are conveyed while being sandwiched by the conveying belts. The take out module 310 conveys the paper sheets P taken out from the ATM cassette 10 to the main module 320. The main module 320 conveys the paper sheets P conveyed from the take out module 310 to the inspection apparatus 328.

The main controller 322 adjusts the take out amount of the paper sheets P of the take out mechanism 324 or the take out speed into multiple steps in accordance with the amount of paper sheets P which are to be processed or in accordance with an input command given by the operator. More specifically, the main controller 322 controls a driver 323a to adjust the rotation speed of the pickup roller of a driving motor 323, and, for example, the main controller 322 sets the take out amount of 1000 sheets, 800 sheets, or 600 sheets per minute. The main controller 322 adjusts the take out amount of the paper sheets P in accordance with the inspection state of the inspection apparatus 328. For example, in a case where the inspection apparatus 328 cannot smoothly perform inspection of the paper sheets P, the main controller 322 reduces the take out amount from 1000 sheets per minute to 800 sheets per minute. Further, in a case where the inspection apparatus 328 detects a double feed of the paper sheets P or a short pitch of the paper sheets P, the main controller 322 temporarily stops or reverses the pickup roller, thus preventing double feed of the paper sheets P and normalizing the feeding pitch of the paper sheets P.

In the main module 320, two rejection units 320a and 320b are provided along the conveying path 326. Multiple accumulation cases 329a, 329b, 329c, and 329d each accumulating the paper sheets P are arranged in a line in the main module 320. The main controller 322 controls a gate (not shown) to distribute the paper sheets P having passed through the inspection apparatus 328 into a rejected bill and a processed bill. The rejected bill means a bill that is determined to be counterfeit (false) by the inspection apparatus 328, or a bill that is determined to be indeterminable because of fold, tear, skew, double feed, and the like. The skew is a state in which the paper sheet P is obliquely inclined with respect to the direction perpendicular to the conveying direction. The rejected bill is distributed into and accumulated in the rejection unit 320a or 320b. The rejected bills may be set again, excluding the false bills, in the supply unit 321 to be taken in again, or it may be counted in the counting data by manual input. The inspection result such as the amount to be processed, the number of sheets, and the like given by the inspection apparatus 328 is sent to the main controller 322, an is saved and displayed on the monitor 325.

The processed bill means that the paper sheet P determined by the inspection apparatus 328 is a genuine (true) and normal bill, or is a true bill and damaged bill. The processed bill is conveyed to and accumulated in the accumulation cases 329a, 329b, 329c, and 329d. For example, the main controller 322 distributes and accumulates the processed bill in any one of the accumulation cases 329a, 329b, 329c, and 329d corresponding to the types (kinds) of banknotes. The main controller 322 collectively accumulates the damaged bills in one of the accumulation cases.

The conveying path 326 is connected to the loading module 350. In a case where the loading module 350 loads the paper sheets P to the ATM cassette 10, some or all of the processed bills inspected by the inspection apparatus 328 of the main module 320 are conveyed via the conveying path 326 to the loading module 350. It should be noted that the main module 320 includes a driving mechanism and a power supply, not shown, for driving the take out mechanism 324, the inspection apparatus 328, conveying mechanisms, and the like, and in addition, includes various kinds of sensors.

The aligning module 330 is provided between the main module 320 and the sealing module 340. The aligning module 330 includes a conveying path 331 for conveying the paper sheets P conveyed by the main module 320, an aligning mechanism 332 provided at the upstream of the conveying path 331, a reversing apparatus 334 provided along the conveying path 331 at the downstream side of the aligning mechanism 332, and multiple accumulation cases 336a, 336b, 336c, and 336d arranged in a line along the conveying path 331.

The aligning mechanism 332 aligns the central position of the paper sheet P conveyed in the conveying path 331 with the central position of the conveying path 331. The aligning mechanism 332 corrects the skewed paper sheet P so that one side thereof is in a direction perpendicular to the conveying direction. The reversing apparatus 334 reverses the direction of the paper sheet P conveyed in the conveying path 331, so that the paper sheet P is fed after the direction of the front and back sides or the forward or backward orientations of the paper sheet P is aligned in any given direction. The paper sheets P of which directions have been aligned and fed by the reversing apparatus 334 are conveyed to the loading module 350 along the conveying path 331, or conveyed to and accumulated in any one of the accumulation cases 336a, 336b, 336c, and 336d in accordance with the types of the sheets. The paper sheets P of which directions have been aligned and fed to the loading module 350 may be returned back to the main module 320, and may be accumulated in the accumulation cases 329a, 329b, 329c, or 329d of the main module 320. The accumulation cases 336a, 336b, 336c, or 336d may be used as accumulation cases accumulating the paper sheets P taken out from the ATM cassette 10 in accordance with the denominations, or may be used as a rejection storage or damaged bill storage accumulating rejected bills or damaged bills taken out from the ATM cassettes 10.

In a case where the sealing processing of the paper sheets P is set, the normal bills taken out from the accumulation case 329 are sent via the aligning mechanism 332 to the sealing module 340, and every predetermined number of normal bills is sealed. The sealing module 340 includes a conveying path 342 in communication with the conveying path 352 of the loading module 350, a first accumulation apparatus 344a and a second accumulation apparatus 344b accumulating predetermined numbers of paper sheets P fed via the conveying path 342, and a sealing apparatus 348 for sealing, with a band, a bundle of a predetermined number of paper sheets P, for example, a bundle of 100 paper sheets P accumulated by the accumulation apparatuses. The second accumulation apparatus 344b may be arranged in an obliquely lower direction with respect to the first accumulation apparatus 344a, and the sealing apparatus 348 may be arranged below the second accumulation apparatus 344b. Further, the discharge unit receiving and accumulating the bundle of paper sheets P sealed by the sealing apparatus 348 is provided below the sealing apparatus 348.

The loading module 350 is connected to the downstream side of the sealing module 340. The loading module 350 includes an attachment unit 351, a conveying path 352, and a take in mechanism 354. A vacant ATM cassette 10# not containing any paper sheet P is detachably attached to the attachment unit 351. The conveying path 352 conveys the paper sheets P conveyed by the sealing module 340. The take in mechanism 354 takes in the paper sheets P conveyed by the conveying path 352, and loads the paper sheets P to the ATM cassette 10#.

When the paper sheets P are put into the ATM cassette 10#, the paper sheet processing apparatus 300 controls the main module 320 and the aligning module 330 so as to take out the paper sheets P accumulated in the accumulation cases 329a, 329b, 329c, and 329d, or the accumulation cases 336a, 336b, 336c, and 336d. The paper sheet processing apparatus 300 takes out the paper sheets P from any one of the accumulation cases 329a, 329b, 329c, and 329d and the accumulation cases 336a, 336b, 336c, and 336d, for example, on the basis of cassette information included in a processing request explained later (i.e., the number of sheets for each type of sheet), and conveys the paper sheets P to the loading module 350, and puts the paper sheets P into the ATM cassette 10#. The paper sheet processing apparatus 300 may put a batch card BC, to which identification information about the paper sheets P contained in the ATM cassette 10# is written, into the ATM cassette 10#.

According to the paper sheet processing apparatus 300 according to the embodiment, by attaching the collection cassette 10A to the take out module 310, the paper sheets P taken out by the take out module 310 from the collection cassette 10A can be determined by the inspection apparatus 328, and can be accumulated in the accumulation cases 329a, 329b, 329c, and 329d, or the accumulation cases 336a, 336b, 336c, and 336d. According to the paper sheet processing apparatus 300 of the embodiment, the paper sheets P accumulated in the accumulation cases 329a, 329b, 329c, and 329d and the accumulation cases 336a, 336b, 336c, and 336d can be taken out, and the paper sheets P can be put into the vacant ATM cassette 10# attached to the loading module 350.

Figure 8:
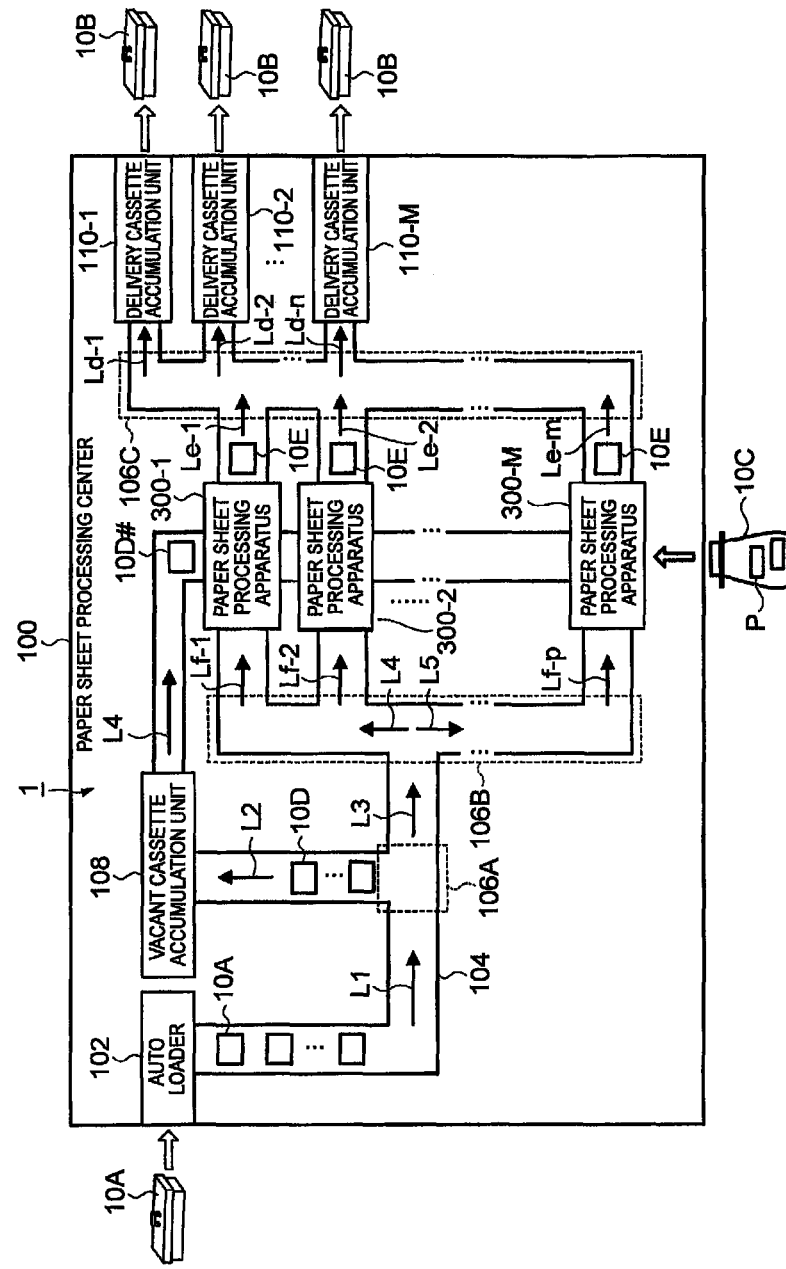
FIG. 8 is a configuration diagram illustrating an example of the paper sheet processing system 1 according to the embodiment.

FIG. 8 is a configuration diagram illustrating an example of the paper sheet processing system 1 according to the embodiment. The paper sheet processing system 1 is installed in the paper sheet processing center 100. The paper sheet processing system 1 includes an auto loader (automatic loading apparatus) 102, a conveyer system (conveying unit) 104, multiple distribution apparatuses (distribution units) 106, a vacant cassette accumulation unit 108, multiple delivery cassette accumulation units 110-1, . . . , 110-N, multiple paper sheet processing apparatuses 300-1, . . . , and 300-M. N and M are any given natural numbers. In the following explanation, in a case where the delivery cassette accumulation units 110-1, . . . , 110N are not distinguished from other delivery cassette accumulation units 110, the delivery cassette accumulation units will be simply referred to as "delivery cassette accumulation units 110", and in a case where paper sheet processing apparatuses 300-1, . . . , 300M are not distinguished from other paper sheet processing apparatuses, the paper sheet processing apparatuses will be simply referred to as "paper sheet processing apparatuses 300".

The auto loader 102 loads and conveys many collection cassettes 10A, which are delivered to the paper sheet processing center 100, to the conveyer system 104. The conveyer system 104 includes a belt conveyer for conveying the collection cassette 10A with, for example, a motor, a drive pulley, a belt, and the like. The conveyer system 104 uses the power generated by the motor to convey the collection cassette 10A. In the conveying process of the conveyer system 104, the distribution apparatus 106 distributes the collection cassette 10A to any one of multiple paths branched in the conveyer system 104. A vacant ATM cassette 10D, which is one of the collection cassettes 10A delivered to the paper sheet processing center 100, and which does not include any paper sheet P, is accumulated in the vacant cassette accumulation unit 108. The delivery cassette accumulation units 110 are installed according to delivery destinations of the delivery cassettes 10B. The ATM cassette 10E including the paper sheets P processed by the paper sheet processing apparatus 300, is conveyed by the conveyer system 104, and accumulated in the delivery cassette accumulation unit 110.

Figure 9:
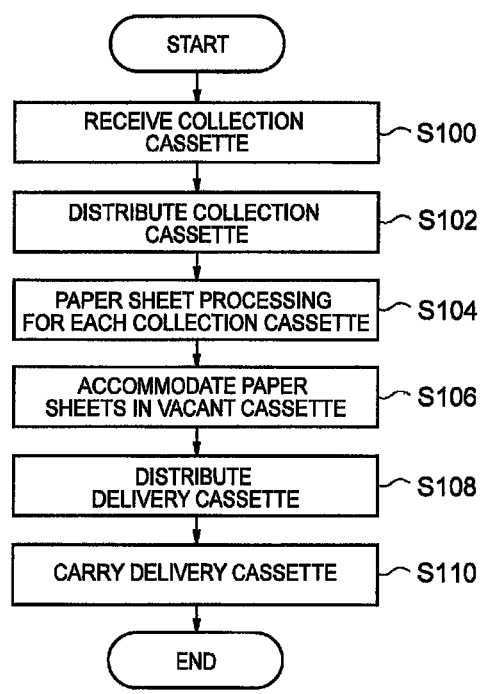
FIG. 9 is a figure illustrating a flow of processing performed by a paper sheet processing center 100 according to the embodiment.

The entire processing of the paper sheet processing center 100 will be explained hereinafter. FIG. 9 is a figure illustrating a flow of processing performed by the paper sheet processing center 100 according to the embodiment. First, the paper sheet processing center 100 receives the collection cassette 10A delivered from the bank B and the like, and the collection cassette 10A is accumulated in the auto loader 102 (step S100). When the paper sheets P contained in the collection cassette 10A are processed by the paper sheet processing apparatus 300 in the paper sheet processing center 100, the collection cassette 10A is provided from the auto loader 102 to the conveyer system 104. The collection cassette 10A provided to the conveyer system 104 is carried along the path L1, and is distributed by the distribution apparatus 106A into the path L2 or the path L3 (step S102).

In step S102, in a case where the collection cassette 10A is a vacant ATM cassette 10, the distribution apparatus 106A distributes the collection cassette 10A into the path L2, and conveys the ATM cassette 10E to the vacant cassette accumulation unit 108. In a case where the collection cassette 10A is not a vacant ATM cassette 10, the distribution apparatus 106A distributes the collection cassette 10A into the path L3. The distribution apparatus 106B distributes the collection cassette 10A, which has been distributed to the path L3, to a path Lf-1, Lf-2, . . . , or Lf-p (p is any given natural number) connected to the paper sheet processing apparatus 300. The collection cassette 10A is distributed to the path L4 or L5, and further, the collection cassette 10A is distributed to the path Lf-1, Lf-2, . . . , or Lf-p. As a result, the collection cassette 10A is conveyed to any one of the multiple paper sheet processing apparatuses 300. The vacant ATM cassette 10D# accumulated in the vacant cassette accumulation unit 108 is carried along the path L4 to any one of the multiple paper sheet processing apparatuses 300. The vacant ATM cassette 10# (10D#) is attached to the take out module 310 of the paper sheet processing apparatus 300.

The paper sheet processing apparatus 300 takes out the paper sheets P contained in the collection cassette 10A, and performs the above processing, and accumulates the paper sheets P in the accumulation cases 329a, 329b, 329c, and 329d, or the accumulation cases 336a, 336b, 336c, and 336d (step S104). The vacant ATM cassette 10D is provided to the paper sheet processing apparatus 300 via the path L4, and the paper sheets P accumulated in the accumulation cases 329a, 329b, 329c, and 329d, or the accumulation cases 336a, 336b, 336c, and 336d are put into the vacant ATM cassette 10D (step S106).

In the paper sheet processing center 100, when the ATM cassette 10 containing the paper sheets P processed by the paper sheet processing apparatus 300 is carried to the delivery cassette accumulation unit 110, the ATM cassette 10E attached to the attachment unit 351 of the paper sheet processing apparatus 300 is placed on the conveyer system 104. The ATM cassette 10E is detached from the attachment unit 351, and placed on the conveyer system 104. The ATM cassette 10E is conveyed along the paths Le-1, Le-2, . . . , and Le-m (m is any given natural number) corresponding to the paper sheet processing apparatus 300, and is distributed by the delivery distribution apparatus 106C (step S108). As a result, the ATM cassette 10E is conveyed along the path Ld-1, Ld-2, . . . , and Ld-n (n is any given natural number), and conveyed to one of multiple delivery cassette accumulation units 110-1, 110-2 . . . and 110-N, and is delivered as the delivery cassette 10B from the paper sheet processing center 100 to the bank B and the like of the delivery destination (step S110).

In this paper sheet processing center 100, the paper sheet processing apparatus 300 may processes the paper sheets P contained in a pouch 10C. In a case where the paper sheet processing apparatus 300 processes the paper sheets P contained in the pouch 10C, the paper sheet processing apparatus 300 processes the paper sheets P taken out by the operator from the pouch B and stacked on the supply unit 321. Accordingly, the paper sheet processing apparatus 300 processes both of the paper sheets P conveyed by the collection cassette 10A and the paper sheets P conveyed by the pouch 10C.

Figure 10:
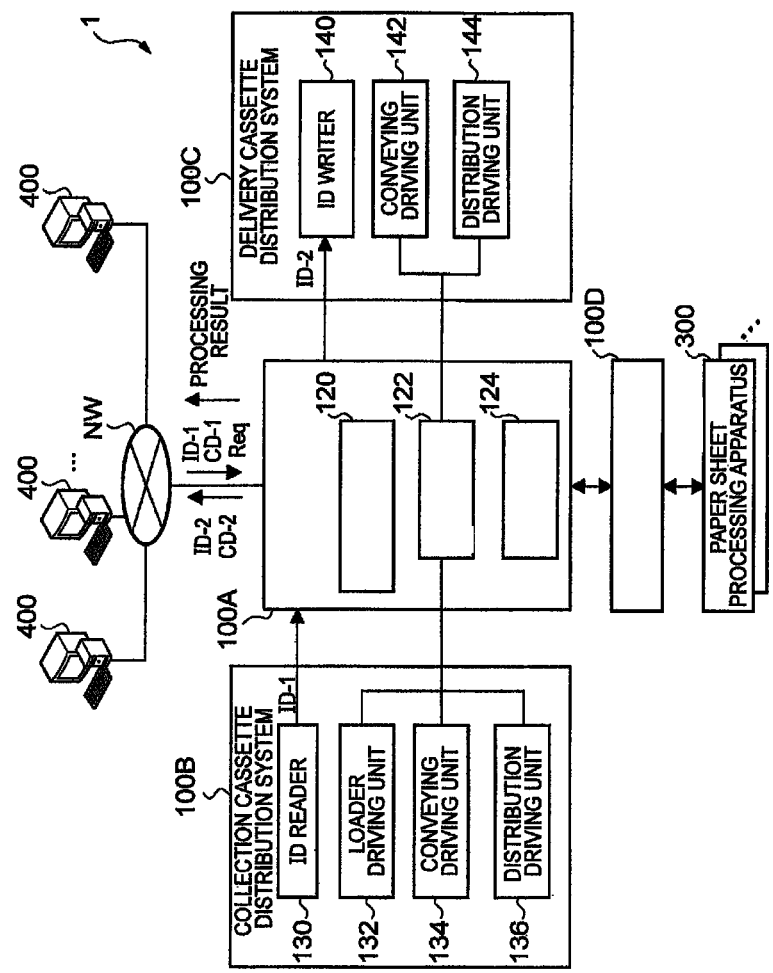
FIG. 10 is a block diagram illustrating a functional configuration of the paper sheet processing system 1 according to the embodiment.

FIG. 10 is a block diagram illustrating a functional configuration of the paper sheet processing system 1 according to the embodiment. The paper sheet processing system 1 includes, for example, a central processing apparatus 100A, a collection cassette distribution system 100B, a delivery cassette distribution system 100C, a management apparatus 100D, and a paper sheet processing apparatus 300.

The central processing apparatus 100A includes, for example, a communication unit 120, a control unit (controller) 122, and a storage unit (memory) 124. The communication unit 120 is a communication I/F for communicating via the communication network NW with multiple bank terminals 400. The communication network NW includes, for example, a WAN (Wide Area Network), a LAN (Local Area Network), a VPN (Virtual Private Network), and the like. For example, the bank terminal 400 receives operator's operation in the bank B, and transmits information to the central processing apparatus 100A. The bank terminal 400 transmits, to the central processing apparatus 100A, the cassette ID (ID-1) of the collection cassette 10A taken out from the Automated Teller Machine 200 in the bank B, the cassette information (CD-1) about the paper sheets P contained in the collection cassette 10A, and the processing request (Req) about the paper sheets P contained in the delivery cassette 10B.

The cassette information corresponding to the cassette ID includes various kinds of information about the paper sheets P contained in the ATM cassette 10. For example, the type of the sheets contained in the ATM cassette 10 (the currency, the denomination, the series, or the like) and the category, the number of sheets for each of the types of sheets, the serial numbers of the paper sheets P, the ID of the Automated Teller Machine 200, a branch number (branch bank number), and the like are associated with the cassette information. Of such cassette information, some or all of the information is transmitted from the bank terminal 400 to the central processing apparatus 100A. The processing request includes some or all of the information about the paper sheets P contained in the delivery cassette 10B.

The control unit 122 is achieved by, for example, causing a processor such as a CPU to execute a program stored in the program memory. A part or all of the control unit 122 may be achieved with hardware such as an LSI (Large Scale Integration), an ASIC (Application Specific Integrated Circuit), or an FPGA (Field-Programmable Gate Array). The control unit 122 performs various kinds of information processing, and controls operation of the paper sheet processing apparatus 300, the collection cassette distribution system 100B, and the delivery cassette distribution system 100C. The control unit 122 transmits to the bank terminal 400 from the communication unit 120, a result obtained by causing the paper sheet processing apparatus 300 to process the paper sheets P contained in the collection cassette 10A, and the cassette ID (ID-2) and the cassette information (CD-2) of the delivery cassette 10B.

The storage unit 124 is achieved with, for example, an HDD (Hard Disc Drive), a flash memory, an EEPROM (Electrically Erasable Programmable Read Only Memory), a ROM (Read Only Memory), a RAM (Random Access Memory), or the like. The storage unit 124 stores the cassette ID and the cassette information received by the communication unit 120 in such a manner that the cassette ID and the cassette information are associated with each other. Further, for example, the storage unit 124 stores a processing request in association with the branch number of the bank B. Further, the storage unit 124 stores the cassette information based on the processing result of the paper sheet processing apparatus 300 in association with the cassette ID read by the ID reader 130. Further, the storage unit 124 stores the cassette information about the paper sheets P contained in the delivery cassette 10B in association with the cassette ID issued by an ID writer (information attachment unit) 140. Further, the storage unit 124 stores the processing situation information in each of the multiple paper sheet processing apparatuses 300. FIG. 11 is a figure illustrating an example of processing situation information of the paper sheet processing apparatus 300 according to the embodiment. FIG. 11 indicate the processing situation information corresponding to the loading storages (accumulation cases) #1, #2, #3, #4, and the ATM cassette 10#, but the processing situation information may be set in association with all of the accumulation cases 329a, 329b, 329c, and 329d, and the accumulation cases 336a, 336b, 336c, and 336d. For example, #1 corresponds to one of or both of the accumulation cases 329a, 336a.

As shown in FIG. 11, the processing situation information is information about, e.g., the distribution processing of the multiple accumulation cases 329a, 329b, 329c, and 329d, and the multiple accumulation cases 336a, 336b, 336c, and 336d, or ATM cassettes 10# performed with each of the paper sheet processing apparatuses 300, the type of the sheets assigned to each of the multiple accumulation cases or the ATM cassettes 10, the number of sheets that can be contained in each of the accumulation cases or the ATM cassettes 10#, and the current number of sheets in each of the accumulation cases or the ATM cassettes 10. The distribution processing of each of the accumulation cases or the ATM cassettes 10# is fixing processing, auto assign processing, and the like. The fixing processing is processing for previously fixing the type of the sheets accumulated in each of the accumulation cases or the ATM cassettes 10#. The auto assign processing is processing in which the type of the sheet accumulated in each of the accumulation cases or the ATM cassettes 10# is dynamically and automatically changed for each series of accumulation of operation. In the auto assign processing, in a case where the paper sheets P are accumulated until the accumulation case or the ATM cassette 10# becomes full, and thereafter, the paper sheets P accumulated from the accumulation case are removed or the ATM cassette 10# is removed, the setting of the type of the sheets associated with the accumulation case or the ATM cassette 10# at this occasion is erased, and the newly set type of the sheets is associated with the accumulation case or the ATM cassette 10#.

The collection cassette distribution system 100B includes, for example, an ID reader 130, a loader driving unit 132, a conveying driving unit 134, and a distribution driving unit 136. The ID reader 130 is a bar code reader. For example, the ID reader 130 emits infrared light to the upper surface of the collection cassette 10A conveyed along the path L1 of the collection cassette 10A, and reads the bar code 14 based on the reflection light. The ID reader 130 analyzes the reading result to decode the cassette ID (ID-1) of the collection cassette 10A, and outputs it to the central processing apparatus 100A. The loader driving unit 132, the conveying driving unit 134, and the distribution driving unit 136 are operated on the basis of the control signal which is output from the control unit 122. The loader driving unit 132 includes a driving mechanism and the like for feeding the collection cassette 10A placed on the auto loader 102 to the conveyer system 104. The conveying driving unit 134 drives a motor and the like of the conveyer system 104 to convey the collection cassette 10A. The distribution driving unit 136 drives the distribution apparatus 106 to distribute the collection cassette 10A.

The delivery cassette distribution system 100C includes, for example, an ID writer 140, a conveying driving unit 142, and a distribution driving unit 144. The ID writer 140 includes, for example, an internal computer for generating the bar code 14 obtained by encoding a new cassette ID (ID-2), a printer for printing the bar code 14, and the like. The ID writer 140 prints a new bar code 14 which is to be attached to the ATM cassette 10E on the basis of a new cassette ID that is output from the control unit 122. The cassette ID encoded in this new bar code 14 is attached to the ATM cassette 10 as the cassette ID corresponding to the bank terminal 400 of the request transmission source that transmitted the processing request. The bar code 14 printed by the ID writer 140 is pasted to the upper surface of the ATM cassette 10E. The conveying driving unit 142 and the distribution driving unit 144 are operated on the basis of the control signal that is output from the control unit 122. The conveying driving unit 142 drives a motor and the like in the conveyer system 104 to convey the ATM cassette 10E. The distribution driving unit 144 drives the distribution apparatus 106 to distribute the ATM cassette 10E.

The management apparatus 100D is an information processing apparatus including an operation device, a display apparatus, and a calculation apparatus. The management apparatus 100D outputs the control signal transmitted by the control unit 122 of the central processing apparatus 100A to multiple paper sheet processing apparatuses 300, so that the paper sheet processing apparatus 300 processes the paper sheet P. The management apparatus 100D receives the processing results of multiple paper sheet processing apparatuses 300, and transmits the processing results of multiple paper sheet processing apparatuses 300 to the central processing apparatus 100A.

Figure 12:
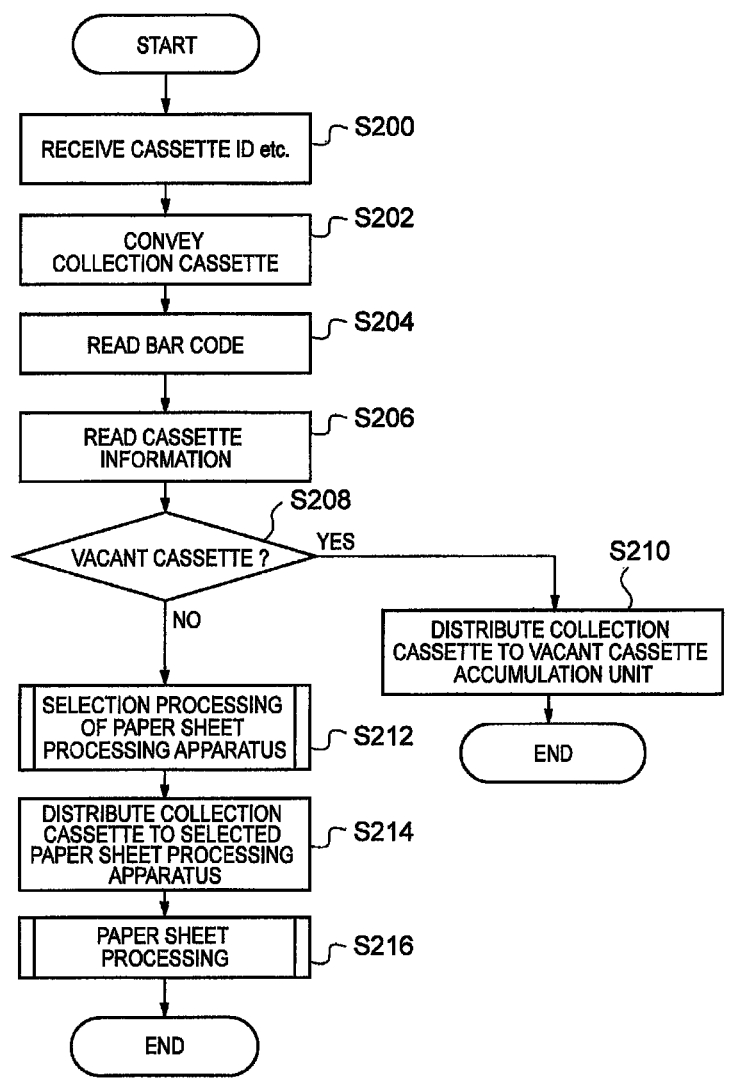
FIG. 12 is a figure illustrating a flow for processing a collection cassette 10A in the paper sheet processing center 100 according to the embodiment.

A flow of processing of the paper sheet processing system 1 according to the embodiment will be explained hereinafter. First, a flow will be explained in which the paper sheet processing center 100 receives the collection cassette 10A, and the paper sheet processing apparatus 300 processes the paper sheets P. FIG. 12 is a figure illustrating a flow for processing of the collection cassette 10A in the paper sheet processing center 100 according to the embodiment.

First, the paper sheet processing system 1 receives the cassette ID (ID-1), the cassette information (CD-1), and the processing request (Req) received from the bank terminal 400 by the central processing apparatus 100A, and stores the cassette ID (ID-1), the cassette information (CD-1), and the processing request (Req) to the storage unit 124 (step S200). The paper sheet processing system 1 uses the auto loader 102 and the conveyer system 104 to convey the collection cassette 10A conveyed to the paper sheet processing center 100 (step S202). The ID reader 130 reads the bar code 14 of the collection cassette 10A being conveyed, so that the cassette ID (ID-1) is output to the central processing apparatus 100A (step S204). The central processing apparatus 100A stores the cassette ID, which is output by the ID reader 130, to the storage unit 124. On the other hand, the control unit 122 reads, from the storage unit 124, the cassette information corresponding to the cassette ID stored in the storage unit 124, i.e., the cassette information CD-1 received form the bank terminal 400 and stored in the storage unit 124 (step S206), and determines whether the collection cassette 10A being conveyed is a vacant cassette or not (step S208). In a case where the collection cassette 10A being conveyed is determined to be a vacant cassette, the control unit 122 controls the distribution driving unit 136 so as to distribute the collection cassette 10A to the vacant cassette accumulation unit 108 (step S210).

In a case where the collection cassette 10A being conveyed is determined not to be a vacant cassette, the control unit 122 selects a paper sheet processing apparatus 300 that processes the paper sheets P contained in the collection cassette 10A (step S212). The control unit 122 controls the distribution apparatus 106 so as to distribute the collection cassette 10A to the selected paper sheet processing apparatus 300 (step S214). The collection cassette 10A conveyed by the conveyer system 104 is attached to the paper sheet processing apparatus 300, and the paper sheet processing apparatus 300 processes the paper sheets P contained in the collection cassette 10A (step S216).

Figure 13:
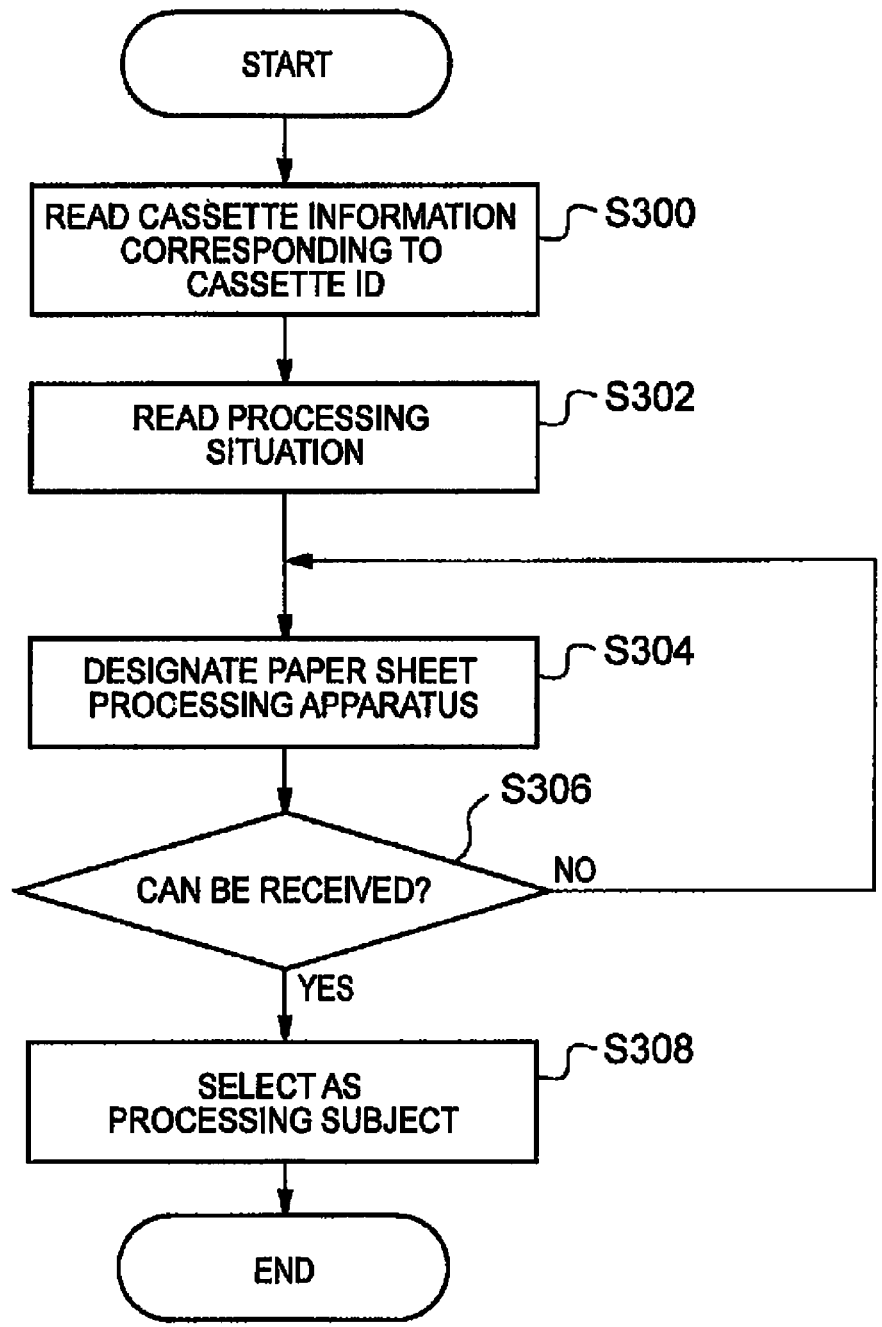
FIG. 13 is a figure illustrating a flow of processing for selecting a paper sheet processing apparatus 300 in the paper sheet processing system 1 according to the embodiment.

Subsequently, processing for selecting the paper sheet processing apparatus 300 in the paper sheet processing system 1 according to the embodiment will be explained. FIG. 13 is a figure illustrating a flow of processing for selecting the paper sheet processing apparatus 300 in the paper sheet processing system 1 according to the embodiment.

The control unit 122 reads cassette information such as the number of paper sheets P corresponding to the cassette ID stored in the storage unit 124 in step S204 (step S300). The control unit 122 reads the processing situation information stored in the storage unit 124 (step S302). The control unit 122 designates any given paper sheet processing apparatus 300 (step S304), and determines whether the collection cassette 10A can be received on the basis of information about the processing situation of the designated paper sheet processing apparatus 300 and the paper sheets P to be processed (step S306). For example, in a case where the number of receivable sheets obtained by subtracting the current number of sheets from the number of sheets that can be processed is more than the number of paper sheets P contained in the collection cassette 10A, the control unit 122 determines that the designated paper sheet processing apparatus 300 can receive the collection cassette 10A. For example, in a case where the number of sheets that can be received is less than the number of paper sheets P contained in the collection cassette 10A, the control unit 122 determines that the designated paper sheet processing apparatus 300 cannot receive the collection cassette 10A. In a case where the control unit 122 determines that the designated paper sheet processing apparatus 300 cannot receive the collection cassette 10A, the processing in step S304 is executed again, and another paper sheet processing apparatus 300 is designated. The control unit 122 selects the paper sheet processing apparatus 300 that is determined to receive the collection cassette 10A as the processing subject of the collection cassette 10A (step S308).

It should be noted that the determination condition for selecting the processing subject of multiple paper sheet processing apparatuses 300 is not limited to the number of sheets that can be received by the paper sheet processing apparatus 300, and may be other conditions. The determination condition for selecting the processing subject of multiple paper sheet processing apparatuses 300 may be, for example, selecting a paper sheet processing apparatus 300 of which amount of accumulation of paper sheets P is the highest (or the lowest). The determination condition for selecting the processing subject of multiple paper sheet processing apparatuses 300 may be making selection in the order of the code numbers attached to the paper sheet processing apparatuses 300. The control unit 122 may determine the processing schedule of the multiple paper sheet processing apparatuses 300 for processing multiple collection cassettes 10A on the basis the cassette information about multiple collection cassettes 10A conveyed continuously and the processing situation information about multiple paper sheet processing apparatuses 300.

Figure 14:
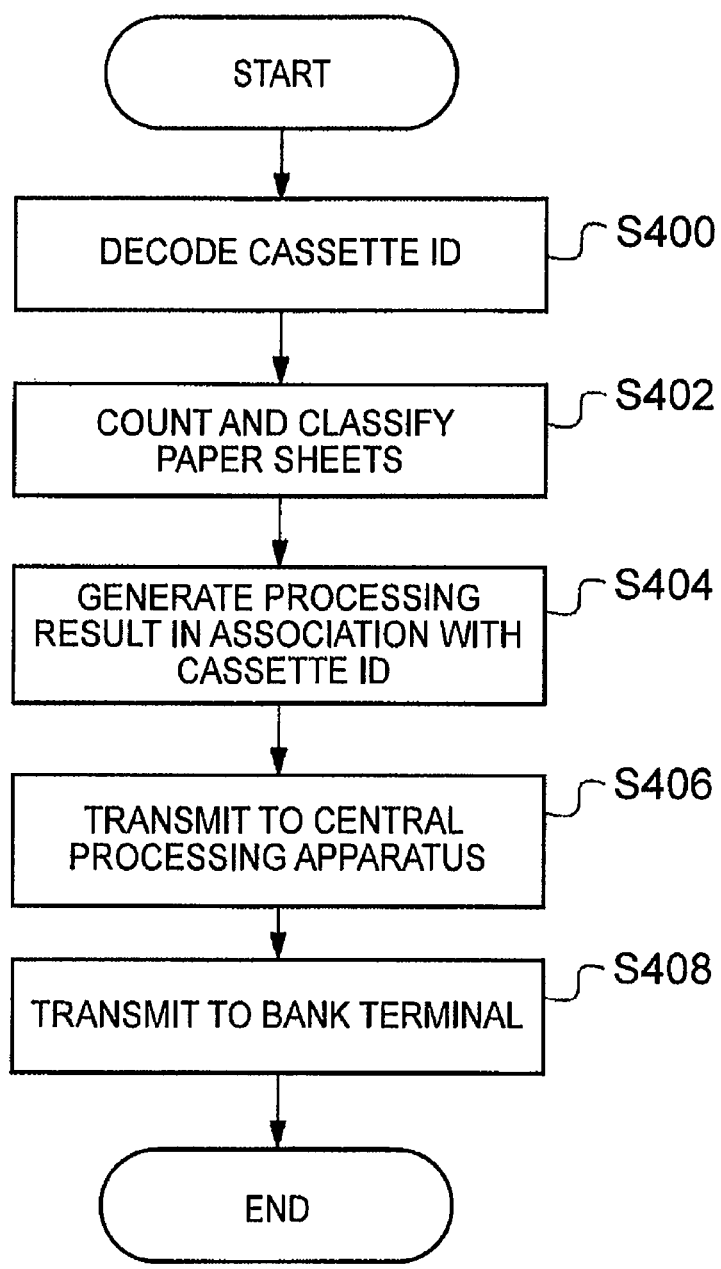
FIG. 14 is a figure illustrating a flow for processing the collection cassette 10A in the paper sheet processing system 1 according to the embodiment.

Subsequently, processing will be explained in which the paper sheet processing apparatus 300 processes the collection cassette 10A in the paper sheet processing system 1 according to the embodiment and transmits the processing result to the bank terminal 400. FIG. 14 is a figure illustrating a flow for processing the collection cassette 10A in the paper sheet processing system 1 according to the embodiment.

First, the paper sheet processing apparatus 300 reads the bar code 14 of the collection cassette 10A attached to the take out module 310, and decodes the cassette ID of the collection cassette 10A (step S400). The paper sheet processing apparatus 300 causes the take out module 310 to take out the paper sheets P contained in the collection cassette 10A, causes the inspection apparatus 318 to count the paper sheets P, and classifies the paper sheets P on the basis of the types of paper sheets P and the like determined by the inspection apparatus 318, and conveys the paper sheets P to the accumulation cases 329a, 329b, 329c, and 329d, or the ATM cassette 10# attached to the loading module 350 (step S402). The paper sheet processing apparatus 300 generates, as a processing result, cassette information about the number of paper sheets P, the type of the paper sheets P, and the like contained in the collection cassette 10A (or 10#) (step S404), and transmits the processing result in association with the cassette ID decoded in step S400 to the central processing apparatus 100A (step S406). The processing result generated by the paper sheet processing apparatus 300 is transmitted via the management apparatus 100D to the central processing apparatus 100A. The central processing apparatus 100A receives the processing result transmitted by the paper sheet processing apparatus 300. The bank terminal 400 to which the processing result is transmitted is determined on the basis of the cassette ID associated with the processing result, and the processing result is transmitted to the bank terminal 400 (step S408). The cassette ID is associated with the processing result by the paper sheet processing apparatus 300, but the embodiment is not limited thereto. The central processing apparatus 100A may associate the cassette ID with the processing result. In a case where the processing result is related to the collection cassette (ATM cassette 10A) attached to the take out module 310, the information about the number of paper sheets P and the type of the paper sheets P of the collection cassette and further information indicating whether there is a false bill or not are transmitted to the bank terminal. In a case where the processing result is related to the collection cassette (ATM cassette 10#) attached to the loading module 350, the information about the number of paper sheets P and the type of the paper sheets P of the collection cassette is transmitted to the bank terminal.

Figure 15:
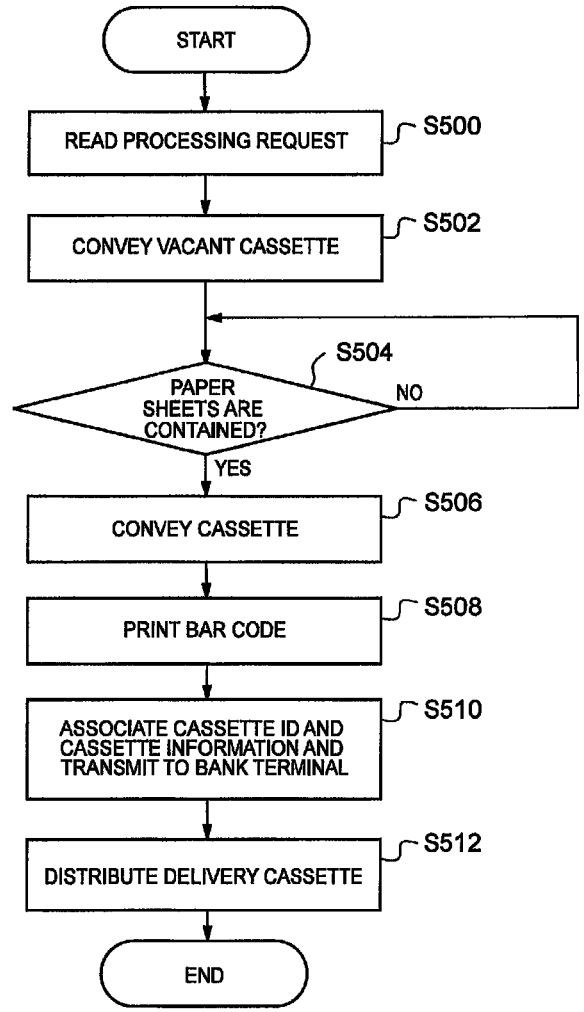
FIG. 15 is a figure illustrating a flow of loading paper sheets P to a vacant ATM cassette 10 and conveying the paper sheets P in the paper sheet processing system 1 according to the embodiment.

Subsequently, processing will be explained in which the paper sheet processing apparatus 300 in the paper sheet processing system 1 according to the embodiment puts the paper sheets P into a vacant ATM cassette 10 and conveys the ATM cassette 10 to the delivery cassette accumulation unit 110. FIG. 15 is a figure illustrating a flow of loading and conveying the paper sheets P to the vacant ATM cassette 10 in the paper sheet processing system 1 according to the embodiment First, the central processing apparatus 100A reads, from the storage unit 124, a processing request transmitted from the bank terminal 400 (step S500), and controls the conveyer system 104 to convey the vacant ATM cassette 10D from the vacant cassette accumulation unit 108 to the paper sheet processing apparatus 300 (step S502). Therefore, the vacant ATM cassette 10D is attached to the attachment unit 351 of the loading module 350. The central processing apparatus 100A transmits the processing result to the paper sheet processing apparatus 300 to which the vacant ATM cassette 10D is attached, so that the paper sheets P satisfying the processing request are loaded to the ATM cassette 10D. The central processing apparatus 100A determines whether the paper sheets P satisfying the processing request are contained in the ATM cassette 10 or not (step S504). In a case where the paper sheets P satisfying the processing request are determined to be contained in the ATM cassette 10, the central processing apparatus 100A controls the conveying driving unit 142 so as to convey the ATM cassette 10E to the delivery cassette accumulation unit 110 (step S506). The central processing apparatus 100A stores the cassette information about the ATM cassette 10E containing the paper sheets P satisfying the processing request to the storage unit 124. Subsequently, the ID writer 140 prints the bar code 14, in which the cassette ID is encoded, to the ATM cassette 10E (step S508). The central processing apparatus 100A reads the cassette information (CD-2) of the ATM cassette 10E from the storage unit 124, and transmits it to the bank terminal 400 in association with the cassette ID (ID-2) that is output by the ID writer 140. The central processing apparatus 100A adopts the ATM cassette 10E as the delivery cassette 10B, and controls the distribution driving unit 144 so as to assign the delivery cassette accumulation unit 110 corresponding to the destination bank B to which it is transported (step S512).

According to at least one embodiment explained above, there is provided; the conveyer system 104 conveying the ATM cassette 10 containing multiple paper sheets P; the distribution apparatus 106 assigning the ATM cassette 10 to any one of the multiple paper sheet processing apparatuses 300 in the conveying process with the conveyer system 104; the central processing apparatus 100A obtaining information about the processing situation of the paper sheet processing apparatus 300; the ID reader 130 for obtaining the cassette ID of the ATM cassette 10 from the ATM cassette 10; the communication unit 120 for receiving the cassette information associated with the cassette ID from another apparatus such as a bank terminal; and the control unit 122 controlling the distribution destination of the ATM cassette 10 distributed by the distribution apparatus 106 on the basis of information about the processing situations of multiple paper sheet processing apparatuses 300, the cassette ID obtained by the ID reader 130, and the cassette information obtained by the communication unit 120; so that the efficiency for processing the paper sheets P contained in the collection cassette 10A can be improved.

According to the embodiment, in a case where the paper sheets P are contained in the ATM cassette 10, the distribution apparatus 106A is controlled so as to distribute the ATM cassette 10 to any one of the multiple paper sheet processing apparatuses 300, and in a case where the paper sheets P are not contained in the ATM cassette 10, the distribution apparatus 106A is controlled to distribute the ATM cassette 10 to the vacant cassette accumulation unit 108. Therefore, the load for distributing the vacant ATM cassette 10 can be alleviated, and the processing efficiency can be improved.

Further, according to the embodiment, with the conveyer system 104 and the distribution apparatus 106, the vacant ATM cassette 10 accumulated in the vacant cassette accumulation unit 108 is distributed and conveyed to the paper sheet processing apparatus 300 containing the paper sheets P. Therefore, the load for attaching the vacant ATM cassette 10 to the paper sheet processing apparatus 300 processing the paper sheets P can be alleviated, and the processing efficiency can be improved.

Further, according to the embodiment, the ID writer 140 for attaching the cassette ID information to the ATM cassette 10 and the communication unit 120 for receiving a request for loading the paper sheets P to the ATM cassette 10 from the bank terminal 400 are provided, and the control unit 122 causes the paper sheets P to be loaded to the vacant ATM cassette 10 attached to the paper sheet processing apparatus 300 on the basis of the request received by the communication unit 120, and the ID writer 140 attaches the cassette ID corresponding to the bank terminal 400 that transmitted the request. Therefore, the cassette ID and the cassette information about the ATM cassette 10 containing the paper sheets P in response to the processing request can be transmitted efficiently.

Further, according to the embodiment, on the basis of the cassette ID attached to the ATM cassette 10 by the ID writer 140, the delivery distribution apparatus 106C is controlled such that the ATM cassette 10 containing the paper sheets P is distributed to the delivery cassette accumulation unit 110 corresponding to the bank terminal 400 that transmitted the request. Therefore, the load for distributing the ATM cassette 10 containing the paper sheets P in response to the processing request can be alleviated, and the processing efficiency can be improved.

As described above, an embodiment provides the following sheet processing system.

More specifically, a sheet processing system includes:
a plurality of sheet processing apparatuses;
a conveying unit conveying a container containing a plurality of sheets;
a distribution unit for distributing the container to any one of the plurality of sheet processing apparatuses;
an identification information reading unit for obtaining identification information from the container;
a communication unit for receiving information about the sheets contained in the container; and
a controller for controlling a distribution destination of the container, on the basis of information about processing situations of the plurality of paper sheet processing apparatuses, the identification information about the container, and the information about the sheets contained in the container.

The embodiment may include one or more of the following features.

The communication unit receives identification information and information about the sheets contained in the container.

The controller distributes the container to any one of the plurality of sheet processing apparatuses.

The controller determines whether the sheets are contained in the container or not, on the basis of information about the sheets received by the communication unit, and in a case where the sheets are determined to be contained in the container, the controller distributes the container to any one of the plurality of sheet processing apparatuses.

The controller determines whether the sheets are contained in the container or not, on the basis of information about the sheets received by the communication unit, and in a case where the sheets are determined not to be contained in the container, the control unit conveys the container to the vacant container accumulation unit, and distributes the conveyed container to any one of the sheet processing apparatuses.

The controller determines whether the sheets are contained in the container or not, and determines whether any one of the sheet processing apparatuses can receive the container or not, and distributes the container to the sheet processing apparatus that can receive the container.

The controller loads the sheets having a requested specification to the container, on the basis of a request received by the communication unit, and records information capable of identifying the container to the container.

The controller loads the sheets having a requested specification to the container, on the basis of a request received by the communication unit, and records information capable of identifying the container to the container, and transmits the identification information about the container and a processing result via the communication unit.

The controller distributes the container to any one of the paper sheet processing apparatuses, and distributes the container processed by the paper sheet processing apparatus to any one of a plurality of delivery container accumulation units.

The controller loads the sheets having a requested specification to the container, and distributes the sheets to a delivery container accumulation unit in accordance with a delivery destination.

The communication unit receives and/or transmits information to/from an Automated Teller Machine of banknotes.

As to the material of the sheet, other than a paper, resin, cloth or the like may be used.

The embodiment also provides a sheet processing method.

A sheet processing method, using a sheet processing system, the sheet processing system including:
a plurality of sheet processing apparatuses;
a container containing a plurality of sheets; and
a conveying unit for conveying the container,
wherein the sheet processing method comprises:
obtaining identification information about the container from the container;
receiving information about the sheets contained in the container by a communication unit; and
controlling a distribution destination of the container, on the basis of information about processing situations of the plurality of sheet processing apparatuses, the identification information about the container, and the information about the sheets contained in the container.

The method may include one or more of the following features.

The communication unit receives identification information and information about the sheets contained in the container.

The container is distributed to any one of the plurality of sheet processing apparatuses.

A determination is made as to whether the sheets are contained in the container or not, on the basis of information about the sheets received by the communication unit, and in a case where the sheets are determined to be contained in the container, the container is distributed to any one of the plurality of sheet processing apparatuses.

A determination is made as to whether the sheets are contained in the container or not, on the basis of information about the sheets received by the communication unit, and in a case where the sheets are determined not to be contained in the container, the container is conveyed to the vacant container accumulation unit, and the conveyed container is distributed to any one of the sheet processing apparatuses.

A determination is made as to whether the sheets are contained in the container or not, and whether any one of the sheet processing apparatuses can receive the container or not, and the container is distributed to the sheet processing apparatus that can receive the container.

The sheets having a requested specification are loaded to the container, on the basis of a request received by the communication unit, and information capable of identifying the container is recorded to the container.

The sheets having a requested specification are loaded to the container, on the basis of a request received by the communication unit, and information capable of identifying the container is recorded to the container, and the identification information about the container and a processing result are transmitted via the communication unit.

The container is distributed to any one of the sheet processing apparatuses, and the container processed by the sheet processing apparatus is distributed to any one of a plurality of delivery container accumulation units.

The sheets having a requested specification are loaded to the container, and the sheets are distributed to a delivery container accumulation unit in accordance with a delivery destination.

Information is receive and/or transmitted to/from an Automated Teller Machine of banknotes.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet processing system comprising:
a plurality of sheet processing apparatuses;
a conveying unit conveying a container containing a plurality of sheets;
a distribution unit for distributing the container to any one of the plurality of sheet processing apparatuses;
an identification information reading unit for obtaining identification information from the container;
a communication unit for receiving information about the sheets contained in the container; and
a controller for controlling a distribution destination of the container, on the basis of information about processing situations of the plurality of sheet processing apparatuses, the identification information about the container, and the information about the sheets contained in the container.

2. The sheet processing system according to claim 1, wherein the controller distributes the container to any one of the plurality of sheet processing apparatuses.

3. The sheet processing system according to claim 1, wherein the controller determines whether the sheets are contained in the container or not, on the basis of information about the sheets received by the communication unit, and in a case where the sheets are determined to be contained in the container, the controller distributes the container to any one of the plurality of sheet processing apparatuses.

4. The sheet processing system according to claim 1, wherein the controller determines whether the sheets are contained in the container or not, on the basis of information about the sheets received by the communication unit, and in a case where the sheets are determined not to be contained in the container, the control unit conveys the container to a vacant container accumulation unit, and distributes the conveyed container to any one of the sheet processing apparatuses.

5. The sheet processing system according to claim 1, wherein the controller determines whether the sheets are contained in the container or not, and determines whether any one of the sheet processing apparatuses can receive the container or not, and distributes the container to the sheet processing apparatus that can receive the container.

6. The sheet processing system according to claim 1, wherein the controller loads the sheets having a requested specification to the container, on the basis of a request received by the communication unit, and records information capable of identifying the container to the container.

7. The sheet processing system according to claim 1, wherein the controller loads the sheets having a requested specification to the container, on the basis of a request received by the communication unit, and records information capable of identifying the container to the container, and transmits the identification information about the container and a processing result via the communication unit.

8. The sheet processing system according to claim 1, wherein the controller distributes the container to any one of the sheet processing apparatuses, and distributes the container processed by the sheet processing apparatus to any one of a plurality of delivery container accumulation units.

9. The sheet processing system according to claim 1, wherein the controller loads the sheets having a requested specification to the container, and distributes the sheets to a delivery container accumulation unit in accordance with a delivery destination.

10. The sheet processing system according to claim 1, wherein the communication unit receives and/or transmits information to/from an Automated Teller Machine of banknotes.

11. A sheet processing method, using a sheet processing system, the sheet processing system including:
a plurality of sheet processing apparatuses;
a container containing a plurality of sheets; and
a conveying unit for conveying the container,
wherein the sheet processing method comprises:
obtaining identification information about the container from the container;
receiving information about the sheets contained in the container by a communication unit; and
controlling a distribution destination of the container, on the basis of information about processing situations of the plurality of sheet processing apparatuses, the identification information about the container, and the information about the sheets contained in the container.

12. The sheet processing method according to claim 11, wherein the container is distributed to any one of the plurality of sheet processing apparatuses.

13. The sheet processing method according to claim 11, wherein a determination is made as to whether the sheets are contained in the container or not, on the basis of information about the sheets received by the communication unit, and in a case where the sheets are determined to be contained in the container, the container is distributed to any one of the plurality of sheet processing apparatuses.

14. The sheet processing method according to claim 11, wherein a determination is made as to whether the sheets are contained in the container or not, on the basis of information about the sheets received by the communication unit, and in a case where the sheets are determined not to be contained in the container, the container is conveyed to a vacant container accumulation unit, and the conveyed container is distributed to any one of the sheet processing apparatuses.

15. The sheet processing method according to claim 11, wherein a determination is made as to whether the sheets are contained in the container or not, and whether any one of the sheet processing apparatuses can receive the container or not, and the container is distributed to the sheet processing apparatus that can receive the container.

16. The sheet processing method according to claim 11, wherein the sheets having a requested specification are loaded to the container, on the basis of a request received by the communication unit, and information capable of identifying the container is recorded to the container.

17. The sheet processing method according to claim 11, wherein the sheets having a requested specification are loaded to the container, on the basis of a request received by the communication unit, and information capable of identifying the container is recorded to the container, and the identification information about the container and a processing result are transmitted via the communication unit.

18. The sheet processing method according to claim 11, wherein the container is distributed to any one of the sheet processing apparatuses, and the container processed by the sheet processing apparatus is distributed to any one of a plurality of delivery container accumulation units.

19. The sheet processing method according to claim 11, wherein the sheets having a requested specification are loaded to the container, and the sheets are distributed to a delivery container accumulation unit in accordance with a delivery destination.

20. The sheet processing method according to claim 11, wherein information is receive and/or transmitted to/from an Automated Teller Machine of banknotes.

* * * * *